May 28, 1929.	G. W. GRING	1,714,666
INSECT POISON FEEDER
Filed June 23, 1924
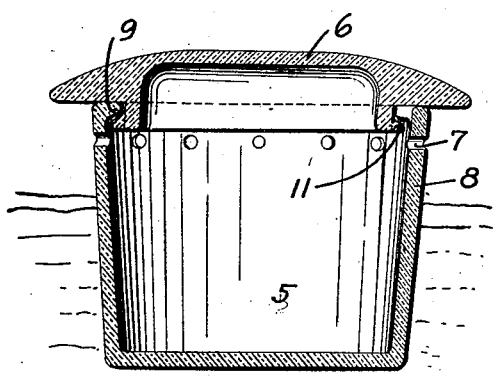
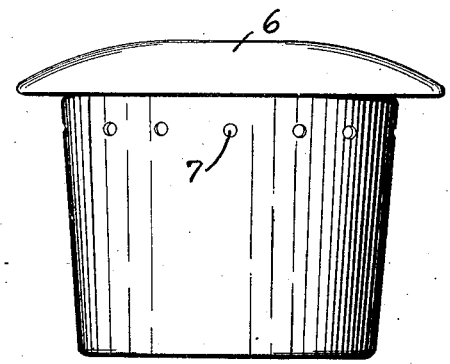
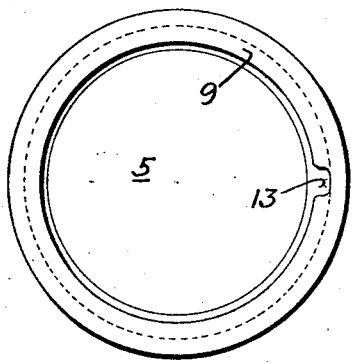
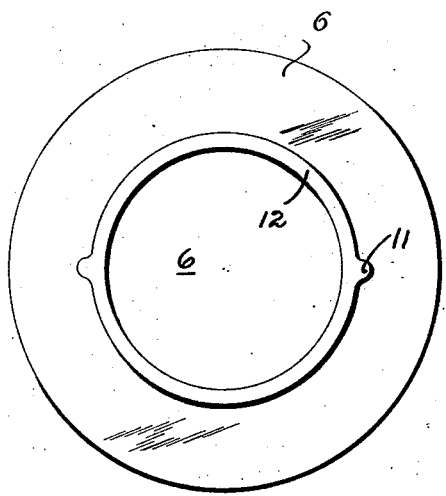
INVENTOR.
George W. Gring.
BY
ATTORNEYS.

Patented May 28, 1929.

1,714,666

UNITED STATES PATENT OFFICE.

GEORGE W. GRING, OF BERKELEY, CALIFORNIA.

INSECT-POISON FEEDER.

Application filed June 23, 1924. Serial No. 721,701.

My invention relates to insect-poison feeders, and particularly to feeders adapted to be positioned out-of-doors.

An object of the invention is to provide an insect-poison feeder which will be non-corroding, may be readily kept clean, and is arranged to shed water when placed in exposed position.

Another object of the invention is to provide a feeder so arranged that insects will be aided in carrying poison therefrom.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side view of the feeder of my invention.

Figure 2 is a cross sectional view of the feeder.

Figure 3 is a plan view of the poison container portion of the feeder.

Figure 4 is a bottom view of the cover of the device.

In placing poisoned foods where ants and other small insects may obtain the same, a number of conditions must be met. Thus, the poisoned food must preferably be placed in containers so arranged that it will be accessible only to the insects for which it is intended. Then too, since the containers are usually placed in exposed positions, they must be so arranged that water cannot readily enter the same. And the containers must preferably be of a material which will not be readily corroded. To satisfy the foregoing and other necessary conditions, the device of my invention, as here shown, comprises a poison compartment 5, and a cover 6 therefor, preferably formed of glazed porcelain. A series of perforations 7 is provided in the wall 8 of the compartment adjacent the top edge thereof for permitting the ingress and egress of the insects to be poisoned. The compartment 5 is preferably formed with its wall surfaces sloping outwardly from the bottom, and in the present embodiment is in the form of an inverted frustrum of a cone. In this manner, an insect which has fed on or is carrying poison is aided in leaving the compartment by being provided with an inclined path over which to travel to the outside of the device. Since the insect, when looking for food, is able to climb a given surface more readily than when carrying food, the outer surface of the wall 8 may be steeper or may even overhang slightly without seriously interfering with the upward progress of an unladen insect thereover. Furthermore, all parts of the interior of a compartment formed as here shown are very accessible for cleaning which is a further advantage in the particular structure of the device here illustrated.

The cover 6 is arranged to extend considerably beyond the top of the compartment and is preferably provided with a convex upper surface. In this manner, the cover will not only serve as a closure for the compartment, but will also prevent the accumulation of water thereon and prevent water coming from above from entering the perforations 7. Means are provided for holding the cover on and in fixed relation to the compartment. As here shown, said means comprises an annular flange 9 extending around the inside of the top edge of the wall 8 above the perforations 7, and cooperating projections 11 provided on the cover and arranged to engage the lower side of the flange 9. As here shown, the projections 11 are formed to extend outwardly of a cylindrical extension 12 provided on the lower side of the cover and arranged to extend through the space defined by the flange 9. To provide for the positioning of the projections 11 below the flange 9, the latter is formed with one or more notches 13 through which a projection 11 may be passed. In this manner the top is arranged to be positioned on and secured to the compartment 5 by inserting one projection 11 under the flange 9, lowering the top in the proper position to have the other projection 11 pass downward through a notch 13, and then causing both projections to be positioned beneath the flange 9 by rotating the top with respect to the compartment.

When in use out-of-doors, the device is usually partly buried in the earth, thereby holding it securely in upright position. Since handling of the feeder is preferably to be avoided, the compartment is made of relatively large capacity to contain a considerable amount of poisoned food. By forming the device of porcelain or similar material, the corrosion to which a metal container would be subjected through contact with the air, earth, or poison is avoided. It will now be noted that arranging the top to shed water permits of the placing of the device in a lawn or other place where frequent sprinkling or rain fall occurs, without permitting the accumulation of water on the device or entrance of such water thereto. Furthermore, it is to be noted that by reason of the overhanging portion of the cover, complete tipping of the container will be prevented, so that a large portion of the contents will be retained in the container even though the latter be tipped to lie on a side.

I claim:—

1. A feeder for insect poison formed of a glazed material and comprising a poison container having the receptacle thereof in the form of the inverted frustum of a cone and having perforations arranged therein adjacent the top, an inwardly extending annular flange formed at the top edge of said container above said perforations, a cover for said container having a convexly curved upper surface and a cylindrical extension extending downwardly therefrom through the space defined by said flange and to said openings.

2. A feeder for insect poison comprising a poison container having perforations arranged therein adjacent the top, an inwardly extending annular flange formed at the top edge of said container above said perforations, a removable cover for said container having a cylindrical extension depending therefrom through the space defined by said flange and to said openings, and cooperating means on said flange and extension for securing the cover to the container, said flange and extension being cooperative to bar the upward crawling of an insect above said perforations.

In testimony whereof, I have hereunto set my hand at Oakland, California, this 11th day of June, 1924.

GEORGE W. GRING.